(12) United States Patent
Smithwick

(10) Patent No.: US 9,693,048 B2
(45) Date of Patent: Jun. 27, 2017

(54) COLOR DISPLAY AND PROJECTION SYSTEM

(71) Applicant: Disney Enterprises, Inc., Burbank, CA (US)

(72) Inventor: Quinn Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 599 days.

(21) Appl. No.: 14/109,828

(22) Filed: Dec. 17, 2013

(65) Prior Publication Data

US 2015/0172646 A1    Jun. 18, 2015

(51) Int. Cl.
*H04N 13/04* (2006.01)
*H04N 9/31* (2006.01)
*G06T 13/20* (2011.01)

(52) U.S. Cl.
CPC ....... *H04N 13/0459* (2013.01); *H04N 9/3147* (2013.01); *H04N 13/0418* (2013.01); *H04N 13/0445* (2013.01)

(58) Field of Classification Search
CPC ...... H04N 13/04; H04N 19/176; H04N 19/44; H04N 19/186; H04N 19/70; H04N 19/593; H04N 19/124; H04N 19/50; H04N 19/172; H04N 19/182; H04N 19/103; H04N 19/117; H04N 19/157; H04N 19/51; H04N 19/105; G06T 13/20
See application file for complete search history.

(56) References Cited

U.S. PATENT DOCUMENTS

| 5,969,754 | A  | * | 10/1999 | Zeman | G09B 21/008 348/136 |
| 6,064,423 | A  | * | 5/2000  | Geng  | G02B 27/2292 345/32 |
| 6,684,219 | B1 | * | 1/2004  | Shaw  | G06F 17/30241 |
| 6,831,678 | B1 | * | 12/2004 | Travis | G03H 1/2294 348/46 |
| 7,952,544 | B2 | * | 5/2011  | Roberts | G09G 3/3413 345/102 |
| 2004/0263500 | A1 | * | 12/2004 | Sakata | H04N 9/3105 345/204 |

(Continued)

Primary Examiner — Sath V Perungavoor
Assistant Examiner — Howard D Brown, Jr.
(74) Attorney, Agent, or Firm — Patent Ingenuity, P.C.; Samuel K. Simpson

(57) ABSTRACT

A process and apparatus provide high speed multicomponent imagery from high frame rate binary spatial light modulators. The process and apparatus decompose an image frame into a plurality of subframes such that each subframe in the plurality of subframes corresponds to an image component of the image frame. The process and apparatus sequentially illuminate, with a spatially addressable backlight, each of the subframes displayed on a spatial light modulator segment through a lenslet array and at least one optical component onto a diffuser. Further, a process and apparatus provide high speed projection with multiple projectors. The process and apparatus decompose an image frame into a plurality of image components. Further, the process and apparatus associate each of the plurality of image components with each of a plurality of associated projectors. The process and apparatus concurrently projects the plurality of image components from the plurality of associated projectors.

27 Claims, 8 Drawing Sheets

(56) References Cited

U.S. PATENT DOCUMENTS

| | | | |
|---|---|---|---|
| 2005/0264550 A1* | 12/2005 | Ohshima | G09G 3/3233 345/204 |
| 2007/0132680 A1* | 6/2007 | Kagawa | G09G 3/3406 345/84 |
| 2008/0030527 A1* | 2/2008 | Namie | G06T 3/4023 345/698 |
| 2008/0284768 A1* | 11/2008 | Yoshida | G09G 3/2022 345/208 |
| 2009/0243995 A1* | 10/2009 | Kimura | G09G 3/342 345/102 |
| 2009/0262055 A1* | 10/2009 | Bilger | G09G 3/2022 345/89 |
| 2009/0267881 A1* | 10/2009 | Takaki | G09G 3/2022 345/89 |
| 2010/0118126 A1* | 5/2010 | Park | G02B 27/2285 348/51 |
| 2012/0287168 A1* | 11/2012 | Botzas | G09G 3/3413 345/690 |
| 2012/0299913 A1* | 11/2012 | Robinson | G02B 6/0048 345/419 |
| 2013/0082905 A1* | 4/2013 | Ranieri | H04N 13/0409 345/32 |
| 2013/0194321 A1* | 8/2013 | Wan | H04N 1/46 345/690 |
| 2013/0215360 A1* | 8/2013 | Pollack | G09G 3/3413 349/61 |
| 2013/0321477 A1* | 12/2013 | Gandhi | G09G 3/2022 345/690 |
| 2013/0321597 A1* | 12/2013 | Suzuki | H04N 13/04 348/54 |
| 2014/0078267 A1* | 3/2014 | Sato | H04N 13/04 348/54 |

\* cited by examiner

COLOR DISPLAY AND PROJECTION SYSTEM

BACKGROUND

1. Field

This disclosure generally relates to the field of display configurations. More particularly, the disclosure relates to high speed projector configurations.

2. General Background

Several current display configurations require high frame rate color projection. For example, temporally multiplexed multilayered volumetric displays and multiview autostereoscopic displays typically require high frame rate color projection. The faster display allows for more layers or views to be displayed. Accordingly, the displayed three-dimensional ("3-D") volume is displayed with more layers and appears smoother with a high frame rate color projection than a slow frame rate color projection. Similarly, a 3-D multiscopic image is displayed with more views and appears to have smoother parallax and supports a greater depth. Projection panning and smooth action replay, e.g., as necessitated by sporting videos and action movies, are other examples that also typically require high frame rate color projection. Current projectors are capable of operating at one hundred twenty Hertz, which is simply not fast enough to produce the high quality display required for these various display configurations. Although current projectors may be rapid enough for 3D stereoscopic projection, the frame rate limits the number of layers in the volumetric display, the number of views in 3-D multiscopic displays, the panning speed in the panned projection, and the apparent fluidity of fast action motion.

Prior to digital projection, film strip projectors and CRTs were utilized for high frame rate applications. As consumer needs are now directed to digital applications, film strip projectors and CRTs cannot provide high frame rates for those consumer needs.

Current high speed projection systems typically utilize a fixed film sequence and are cumbersome for long run times. Further, new media is typically difficult to utilize and update with the current high speed projection systems. When high speed binary projectors are utilized in multi-view 3D displays, greyscale is usually approximated utilizing spatial dithering of binary pixels. The spatial dithering reduces the resolution of the image and introduces artifacts. Further, many current projection systems, e.g., Digital Micromirror Devices ("DMDs"), utilize temporal multiplexing for time sequential luminance and color. Such projection systems are incompatible with the volumetric display, panned projection, and fast action motion configurations because the time sequential colors and/or luminance become separated. As a result, the time sequential colors and/or luminance appear as separate layers or rainbow smear artifacts.

Current Light Emitting Diode ("LED") displays can be modulated quickly, e.g., at greater than ten kilohertz, but are typically quite large, e.g., stadium displays, or quite small, e.g., Organic Light Emitting Diode ("OLED") microdisplays. Further, LED displays typically run at common slow frame rates, e.g., sixty Hertz or one hundred twenty Hertz, at least partially because LEDs rely on pulse width modulation ("PWM") to control pixel luminance, i.e., brightness. LEDs are driven with a constant voltage and have a luminance varied with PWM, e.g., the LEDs are turned on and off at different duty cycles, since the LED luminance is nonlinear with voltage and direct current control is too expensive and cumbersome.

Another current approach has a volumetric display utilizing a rim-driven varifocal mirror and high speed digital light processing ("DLP") backlit liquid crystal display ("LCD") panel. A high speed DMD projector is utilized as a pixel-level backlight to selectively backlight portions of a slow frame rate LCD panel. The varifocal mirror places sections of the LCD image at different planes to provide two and one half dimensional, e.g., extruded, volumetric imagery. Only one image is shown on the LCD panel at a time and only portions of that image are selectively backlit in sequence by the high-speed projector. Those partial images never overlap. Each color voxel in the volumetric display is given a single depth or multiple depths, but all depths must be the same color. The layers are not independent. As a result, the holes in the layers become apparent to a user viewing the display off-axis, e.g., not directly in front of the display. The high speed projector and LCD must be aligned pixel for pixel. Accordingly, the combination of the high speed projector is not scalable to multiple LCDs and projectors for higher resolution, speed, and/or luminance. The volumetric display's single LCD image with high speed projector backlight is also not compatible with panned projection and smooth action replay as multiple high speed image frames are not provided. A single image whose sections are sequentially lit in rapid order is only provided.

Therefore, current projection systems do not provide adequate image quality for particular projection applications. A high speed full color projection system that projects at a frame rate of at least one thousand frames per second without reliance on luminance and color generation through temporal multiplexing is needed for a variety of projection applications, e.g., volumetric display, panned projection, and fast action motion configurations.

SUMMARY

A process and apparatus provide high speed multicomponent imagery from high frame rate spatially addressable backlights or illuminators and low frame rate spatial light modulators ("SLMs"). The process and apparatus decompose an image frame into a plurality of subframes such that each subframe in the plurality of subframes corresponds to an image component of the image frame. The process and apparatus sequentially illuminate, with a spatially addressable backlight, each of the subframes displayed on a spatial light modulator segment through a lenslet array and at least one optical component onto a diffuser.

Further, a process and apparatus provide high speed projection with multiple projectors. The process and apparatus decompose an image frame into a plurality of image components. Further, the process and apparatus associate each of the plurality of image components with each of a plurality of associated projectors. In addition, the process and apparatus concurrently projects the plurality of image components from the plurality of associated projectors.

In addition, an apparatus has a diffuser and a plurality of projectors. Each of the plurality of the projectors has a spatial light modulator and a lens assembly. The plurality of projectors each sequentially illuminates a corresponding subframe displayed on a spatial light modulator segment of the corresponding spatial light modulator onto a common position of the diffuser. Alternatively, the plurality of projectors each shutters a corresponding subframe displayed on a spatial light modulator segment of the corresponding spatial light modulator onto a common position of the diffuser.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A high speed display and projection system is provided to obtain independent high speed color images without temporally multiplexing luminance or color. The high speed display or projection system is able to produce high frame rate greyscale or color image sequences compatible with temporally multiplexed 3D multiview displays, panned projection, and action replay. Further, the high speed display or projection system may be utilized with slow speed full color spatial light modulators, e.g., an LCD panel with a frame rate of one hundred twenty Hertz, or utilized with high speed monochrome SLMs, e.g. a binary DMD with a frame rate of thirty two-thousand frames per second.

The high frame rate display allows more levels or views to be available and independent in 3-D multilayered or multiview displays, which results in smoother, more detailed, and more realistic looking 3-D images. Further, the high frame rate display provides for faster, smoother, and sharper panned projection without gaps along the motion path and without the need to include unrealistic motion blur. In addition, the high frame rate display provides for the ability to replay smooth, sharp, and more realistic action sequences utilizing the actual captured frames from high speed cameras instead of resorting to a television's built in view interpolation. The high frame rate display may be utilized for a variety of other applications such as tracked image projection and relighting, 3-D color object digitization utilizing high speed color structured light, and temporally encoded infrared ("IR") or hidden images for interactive applications.

In one embodiment, the high speed display and projection system utilizes sequential illumination for different subframes of an animation sequence. An image frame is the temporal component of an animation sequence. The animation sequence is decomposed into a series of subframes that are displayed in rapid sequence from a multitude of slow, but full color, SLMs and combined at a diffuser screen to recreate the original animation sequence with a higher frame rate than any of the slow SLMs individually.

Figure 1A:
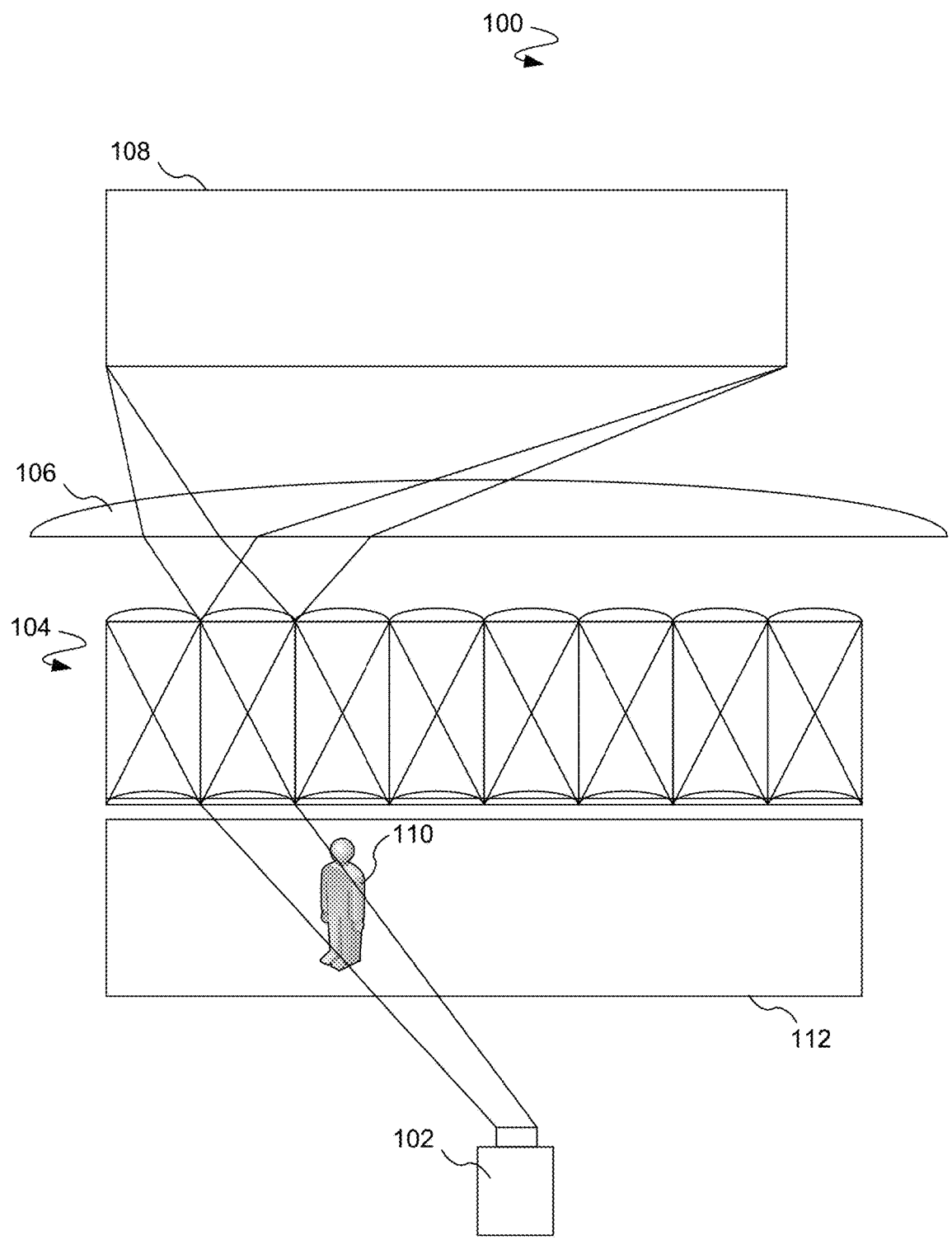
FIG. 1A illustrates a high speed sequential illumination configuration.

FIG. 1A illustrates a high speed sequential illumination configuration 100. The high speed sequential illumination configuration 100 includes a high speed spatially addressable backlight 102, e.g., a binary projector, a slow frame rate SLM, e.g. one hundred twenty Hertz LCD panel 112, a lenslet array 104, a common transform lens 106, a diffuser 108, an image 110. The high speed spatially addressable backlight 102 may be a binary projector or other type of illumination device that provides a sequence of fixed patterned binary light patterns at a high frame rate. An example of a high frame rate is thirty two thousand frames per second. A high speed spatially addressable backlight 102 with a frame rate that is greater or less than thirty two thousand frames per second may also be utilized. The high speed spatially addressable backlight 102 sequentially illuminates one of several tiled subframes on the SLM 112.

As an example, a clip of an animated image 110 of a person may be composed of a sequence of nine different subframes. The high speed spatially addressable backlight 102 rapidly illuminates the multiple subframes in sequence. The subframes are each illuminated through a corresponding lenslet in the lenslet array 104. In another embodiment, a matching field lenslet array may be located at the subframe image. The lenslets in the matching field lenslet array redirect the light from each subframe so that the light substantially enters only the corresponding lenslet in the lenslet array 104. In yet another embodiment, light baffles separate different lenslet pairs and also confine light to corresponding lenslet pairs.

The optical component 106, e.g., a transform lens, overlaps the projected multiple subframes so that the projected subframes share a common position at the diffuser 108. The diffuser 108, e.g., a display screen, then scatters or distributes the light evenly in all directions so the displayed image may be seen from many viewing positions. The combination of lenslet array 104 and the common transform lens 106 may be considered a coarse integral optical component. A coarse integral optical component may be utilized to angularly multiplex multiple viewpoint images into a single 3-D image. The high speed sequential illumination configuration 100 illustrated in FIG. 1 allows multiple images in an animated clip to be angularly multiplexed onto the diffuser 108 in sequence. The diffuser 108 then evenly distributes the image 110 to all viewpoints.

Alternatively, the combination of the common transform lens 106 and the lenslet array 104 may be considered a reverse replication optical component. The replication optical component has minimal spacing between the transform lens 106 and the lenslet array 104. The replication optical component is typically utilized to tile multiple copies of a single image, e.g., holographic displays. The reverse replication optical component may be utilized in reverse to display multiple images at a single location.

The color and/or greyscale information is contained in the slow frame rate SLM 112, e.g., an LCD panel. Accordingly, the high speed spatially addressable backlight 102 does not have to store any of the color and/or greyscale information. The addressable segments of the high speed spatially addressable backlight 102 are relatively large compared to a pixel and do not have to be aligned pixel by pixel with the SLM 112. Further, the high speed spatially addressable backlight 102 utilizes repetitive segmented illumination sequences without any need for computations. A variety of devices such as an LED array with optics, a continuous backlight with ferro-electric shutters, or a high-speed binary projector may be utilized as a high speed spatially addressable backlight 102.

A variety of other implementations other than the high speed sequential illumination configuration 100 may be utilized to provide high speed projection via sequential illumination for different subframes. For example, multiple slow SLMs and/or multiple high speed binary projectors or illumination systems may be utilized. Alternatively, a single illuminator and a high speed ferro electric shutter for each slow SLM segment may be utilized. As yet another alternative, a single or multiple two-dimensional ("2-D") holographic projectors may be utilized to efficiently send light to each slow LCD segment. The 2-D holographic projectors may be based on high speed binary SLMs.

Adjustments to the slow frame rate SLM 112 segmentation may be performed to change the frame rate, image resolution, and speed. For example, a three by three image segmentation of a one thousand nine hundred twenty by one thousand eighty pixel at one hundred twenty Hertz SLM 112 provides a one thousand eighty hertz and a six hundred forty by three hundred sixty pixel image resolution.

Although a single high speed spatially addressable backlight 102 and a single SLM 112 are illustrated in FIG. 1, multiple backlights 102 and/or multiple SLMs 112 may be utilized. Further, multiple backlights 102 and/or multiple SLMs 112 may be utilized to increase the speed and resolution of the system. The combination of the spatially addressable backlight 102, segmented or multiple SLMs 112, and the lenslet array 104 is equivalent to an array of projectors.

Figure 1B:
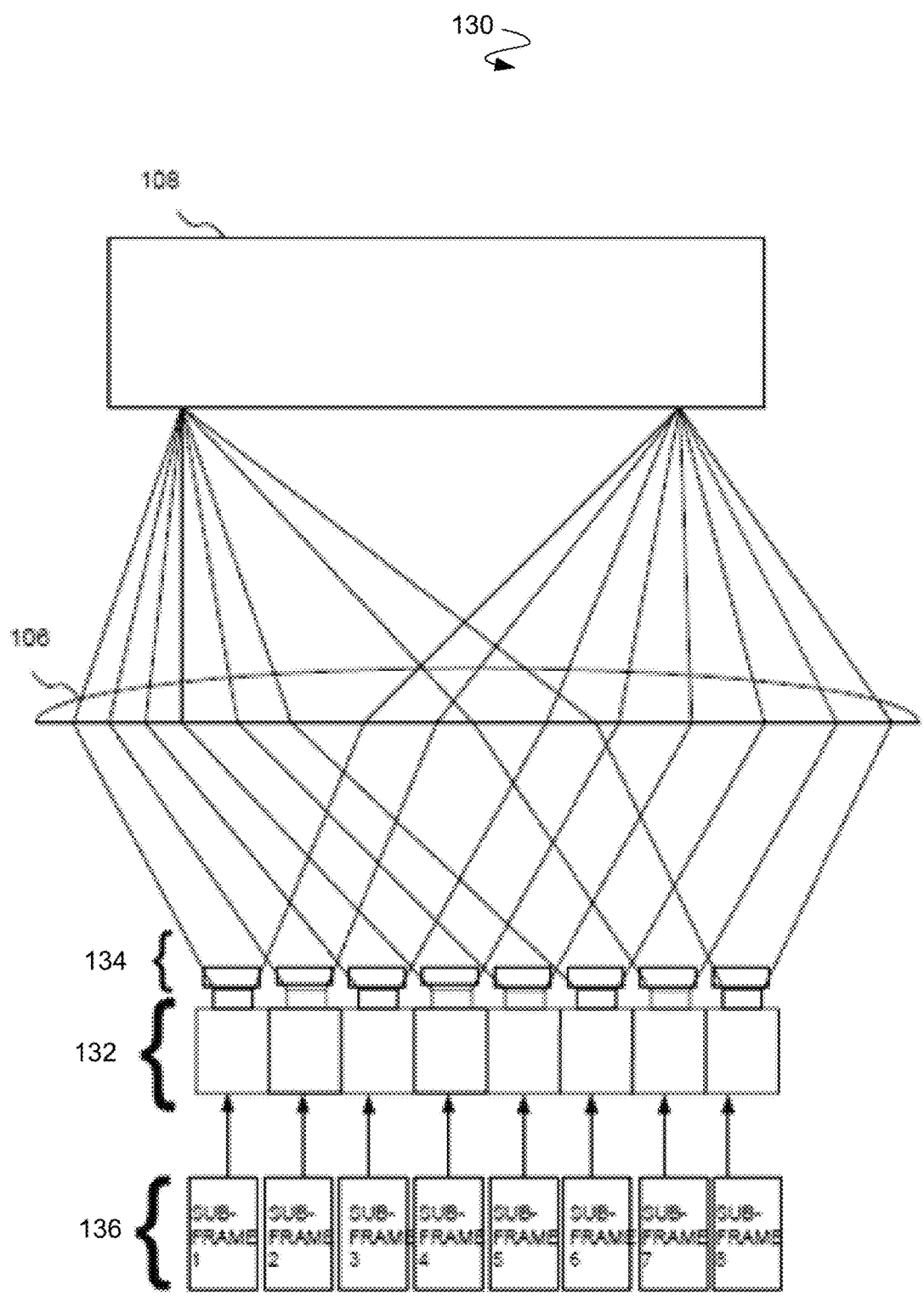
FIG. 1B illustrates an alternative high speed sequential illumination configuration 130.

FIG. 1B illustrates an alternative high speed sequential illumination configuration 130. The alternative high speed sequential illumination configuration 120 has a synchronized projector array of N projectors 132 each projecting a different subframe 136 of an animated sequence, which are sequentially illuminated or shuttered rapidly with ferroelectric shutters 134, other types of high speed shutters, or the like, e.g., 1/Nth each projector's normal frame period, to consecutively display frames on the diffuser 108 for an overall increase in N times the normal frame rate. The projectors 132 may be arranged to aim at the same location on the diffuser 108 so their corresponding images, e.g., subframes 136, overlap. Correction may be utilized for the overlapping. Alternatively, the optical axes of the projectors are parallel. The projected images pass through a common transform lens 106 so their images overlap, e.g., subframes 136, on the diffuser 108.

In an alternative embodiment, the array of N projectors 132 may not be prepackaged as projectors. For example, a high frame rate binary SLM with illumination and projection optics may be utilized instead of a prepackage projector.

Figure 2:
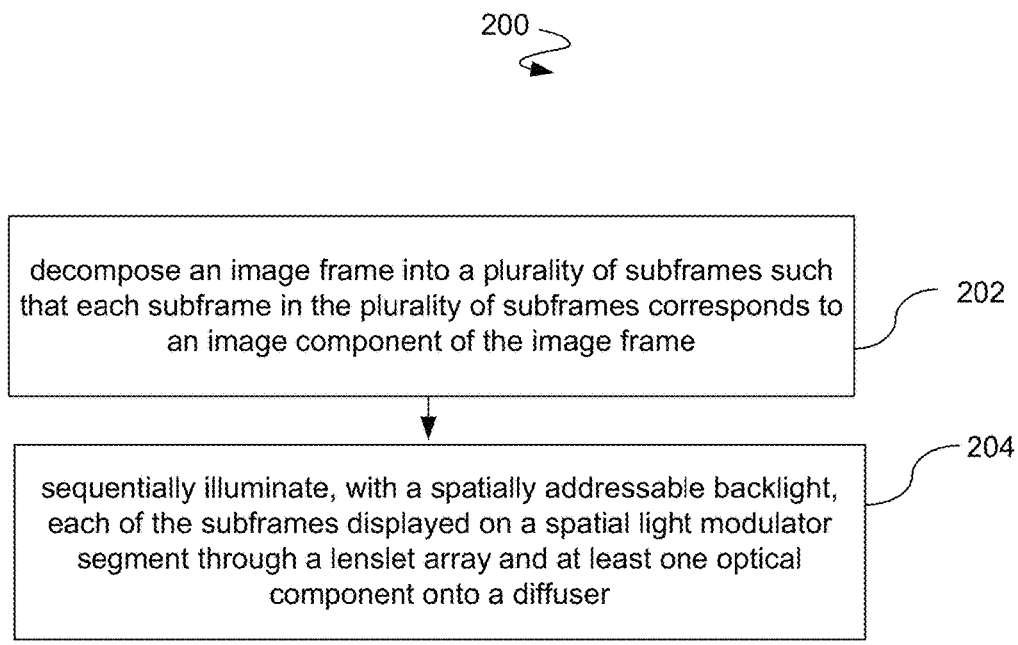
FIG. 2 illustrates a process that is utilized to provide high speed multicomponent imagery from high frame rate binary SLMs.

FIG. 2 illustrates a process 200 that is utilized to provide high speed multicomponent imagery from high frame rate binary SLMs. At 202, the process 200 decomposes an image frame into a plurality of subframes such that each subframe in the plurality of subframes corresponds to an image component of the image frame. An example of an image component is an image frame of an animated sequence. At 204, the process 200 sequentially illuminates, with a spatially addressable backlight, each of the subframes displayed on a spatial light modulator segment through a lenslet array and at least one optical component onto a diffuser.

In another embodiment, the high speed projection system utilizes multiple high speed binary projectors with bit plane images. An image's brightness, color, and or other attributes are decomposed into multiple binary images, i.e., bit planes, with each component being simultaneously displayed on one of several high speed binary SLMs in an array, which are then combined in an optical apparatus or at the diffuser 108 to recreate the original grayscale image, high frame rate grayscale or true color image sequence.

Figure 3:
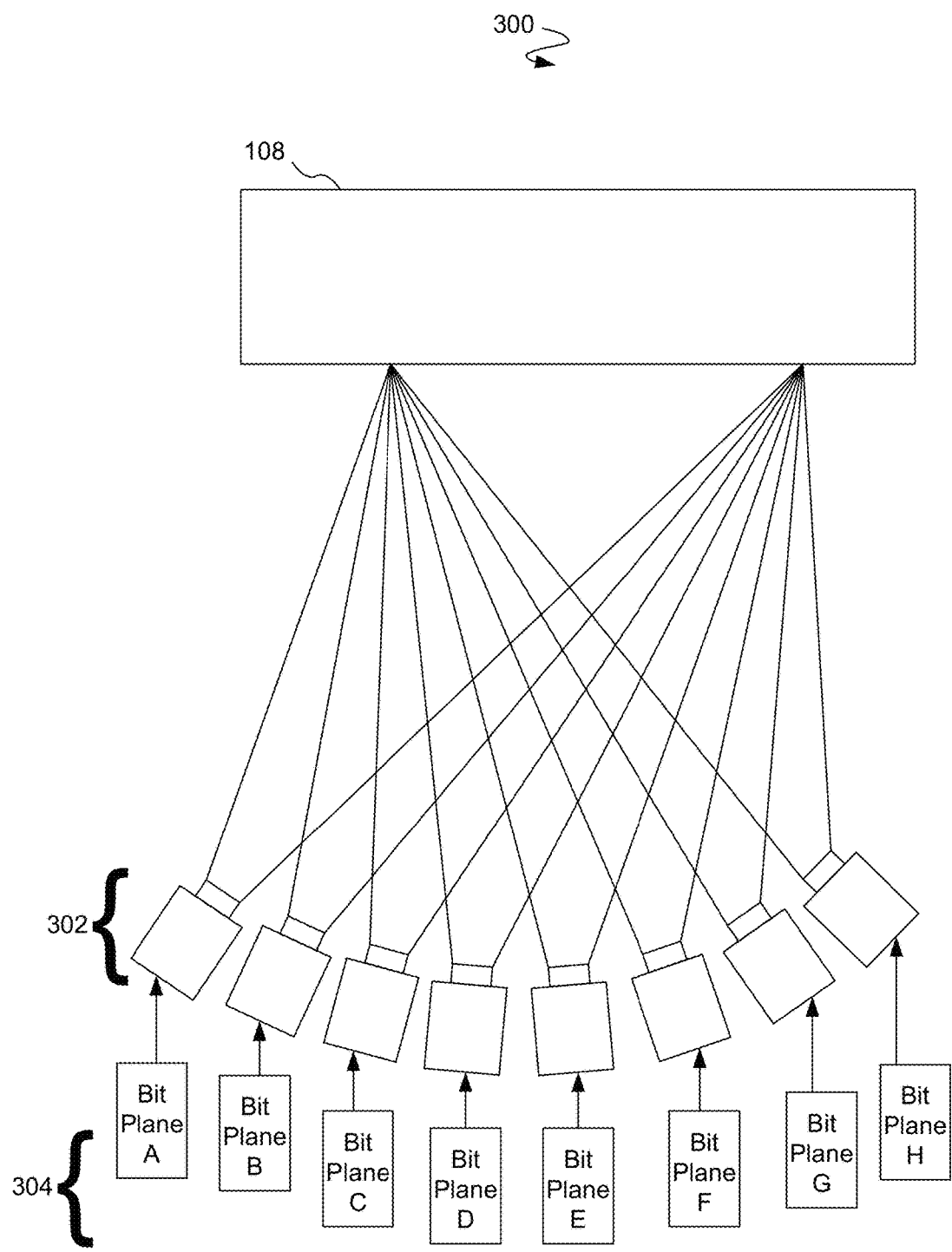
FIG. 3 illustrates a high speed overlapping multiple projector configuration.

FIG. 3 illustrates a high speed overlapping multiple projector configuration 300. A plurality of projectors 302, e.g., binary projectors, each has a corresponding image component 304, e.g., a bit plane, that has been decomposed from an image frame. Each of the plurality of projectors 302 projects its corresponding image component onto the diffuser 108. The plurality of projectors 302 is positioned so that the projectors project their corresponding image components 304 in an overlapping manner. As a result, the various bit planes are composed to form the original image on the diffuser 108. In one implementation, the plurality of projectors 302 each has an SLM or section thereof, an illumination assembly, and a lens assembly. In an alternative implementation, the plurality of projectors 302 may each have an OLED component or section thereof and a lens assembly.

For example, a greyscale image may have two hundred fifty six different greyscale attributes, e.g., different levels of brightness intensity. The image may be decomposed into a set of eight binary, e.g., monochrome black or white images or bit planes, with each binary image in the set possibly contributing half as much luminance intensity as the previous image in the set. For example, the first bit plane is the most significant bit and is a fifty percent threshold monochrome bitmap of the original greyscale image, with each binary pixel, i.e., bit, describing whether the corresponding original image pixel is brighter than half the greatest possible intensity, e.g., white or not black. The next bit plane describes whether adding half as much intensity, e.g., twenty five percent of full intensity, would bring the intensity from an additive combination of the two bit plane closer to the desired grayscale image's intensity pixel by pixel. This process of possibly adding half as much intensity as the previous image, e.g., twelve and one half percent, six and one quarter percent, etc., continues for the remaining bit planes, until the final bit plane, i.e., the least significant bit, describes whether adding yet another half as much intensity as the penultimate bit plane, i.e., approximately three and nine tenths percent intensity, for eight bit planes brings the intensity of the sum of the total combination of eight bit planes closer to the corresponding grayscale image's intensity pixel by pixel. The recombination of eight bit planes can reconstruct the original desired grayscale image with two hundred fifty six possible levels of intensity.

Each bit plane is assigned to one of the plurality of projectors 302, with each of the plurality of projectors 302 assigned half of the luminance intensity of the previous projector 302. The first bit plane, i.e., the most significant bit, is displayed on the binary projector with the greatest intensity, the second bit plane is displayed on the binary projector with a brightness that is half that of the first projector and so on, until the final eighth bit plane binary image, i.e., the least significant bit, is displayed on a projector 302 with the lowest intensity that is half as bright as that of the penultimate projector. The images simultaneously overlap on the diffuser 108. The intensities are combined to reconstruct and display the desired grayscale image.

Further, the high speed overlapping multiple projector configuration 300 may be utilized to display color images at a particular amount of frames per second that are allowed and/or required. For example, a high frame rate of one thousand frames per second may be needed for action replay without rainbow or motion artifacts resulting from temporally displaying color and/or brightness components in sequence, i.e., temporal multiplexing. The image may be decomposed according to brightness into multiple binary images to be replayed on multiple high speed binary projectors and combined to meet the allowance or requirement of one thousand frames per second of imagery that is not temporally multiplexed in color or intensity.

Alternatively, full color images, e.g., images with greater than sixteen million colors, may be decomposed into a few color component images, e.g., a red, green, and blue color component images. These color component images consist of a single color, but have pixels of varying luminances. These single color component images can then be further decomposed into eight binary color images with different luminances. Accordingly, eight binary images are utilized for each of the three colors components. Each binary image may then be assigned to one projector. Therefore, twenty four projectors 302 are utilized for full color. Other decompositions in color, brightness, or other characteristics may be used and psychophysical effects may also be accounted for by differing the number of components and corresponding projectors for each characteristic. For instance, the human visual system is more sensitive to green and least sensitive to blue. A two hundred fifty six color image may be decomposed into more green and red brightness levels, e.g., eight levels each, than blue, e.g. four levels. A system which reproduced images that used such a decomposition would require eight high speed binary projectors: three projectors to reproduce the eight green brightness levels, three projectors for eight red brightness levels, and two projectors for the four blue brightness levels.

The projectors 302 are arranged in FIG. 3 to directly project light toward the diffuser 108 at a common position of the diffuser 108. In alternative embodiments, the projectors 302 do not have to be arranged to provide direct projection.

Figure 4:
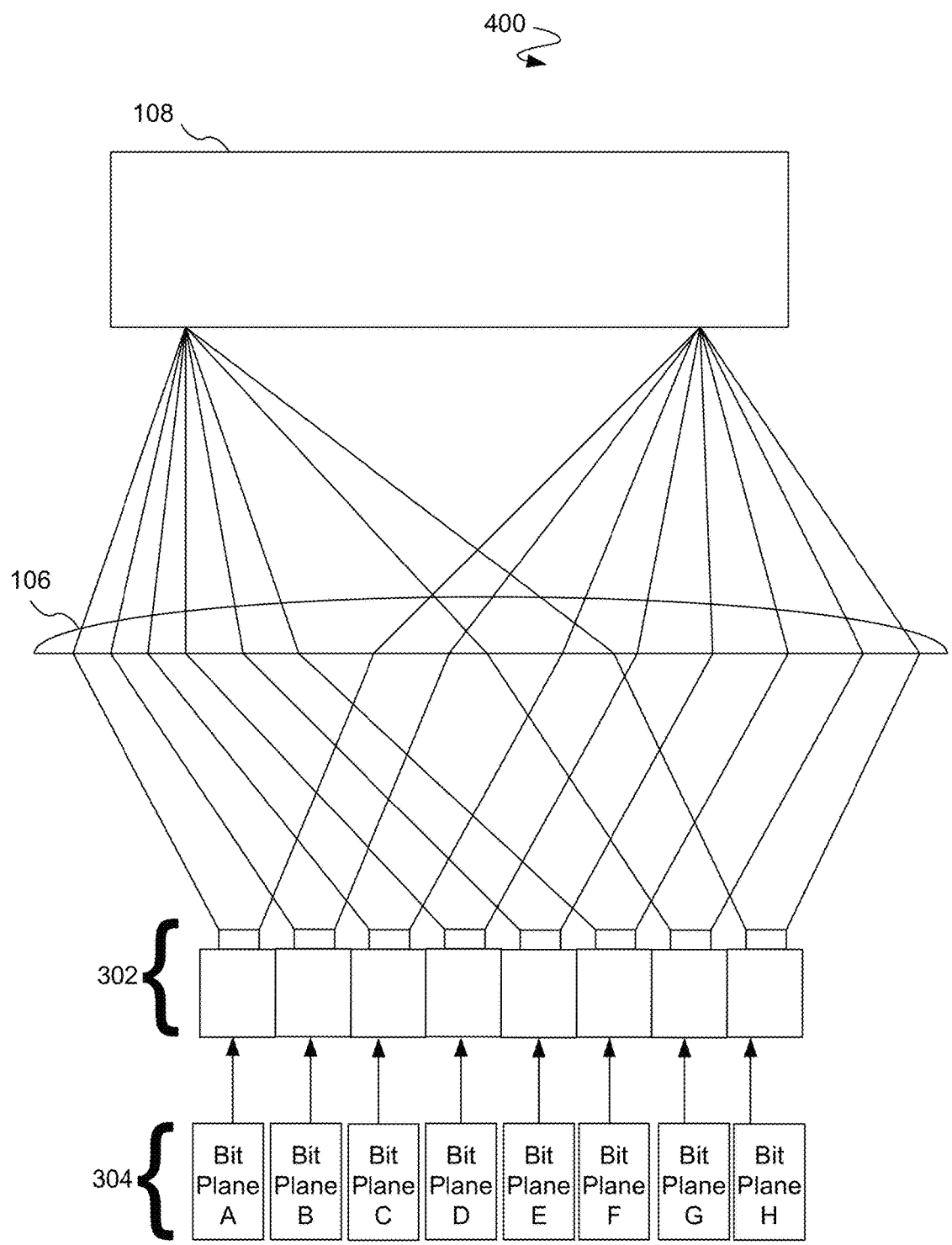
FIG. 4 illustrates a high speed multiple projector and optics configuration.

FIG. 4 illustrates a high speed multiple projector and optics configuration 400. In contrast with the overlapping multiple projector configuration 300 illustrated in FIG. 3, the projectors 302 in FIG. 4 are arranged so the optics configuration combines their outputs so they appear to project their respective bit planes from a common optical center towards the diffuser 108. The optical component 106, e.g., a beam splitter, receives the light projected from each of the projectors 302 and redirects the light to a common position at the diffuser 108.

Figure 5:
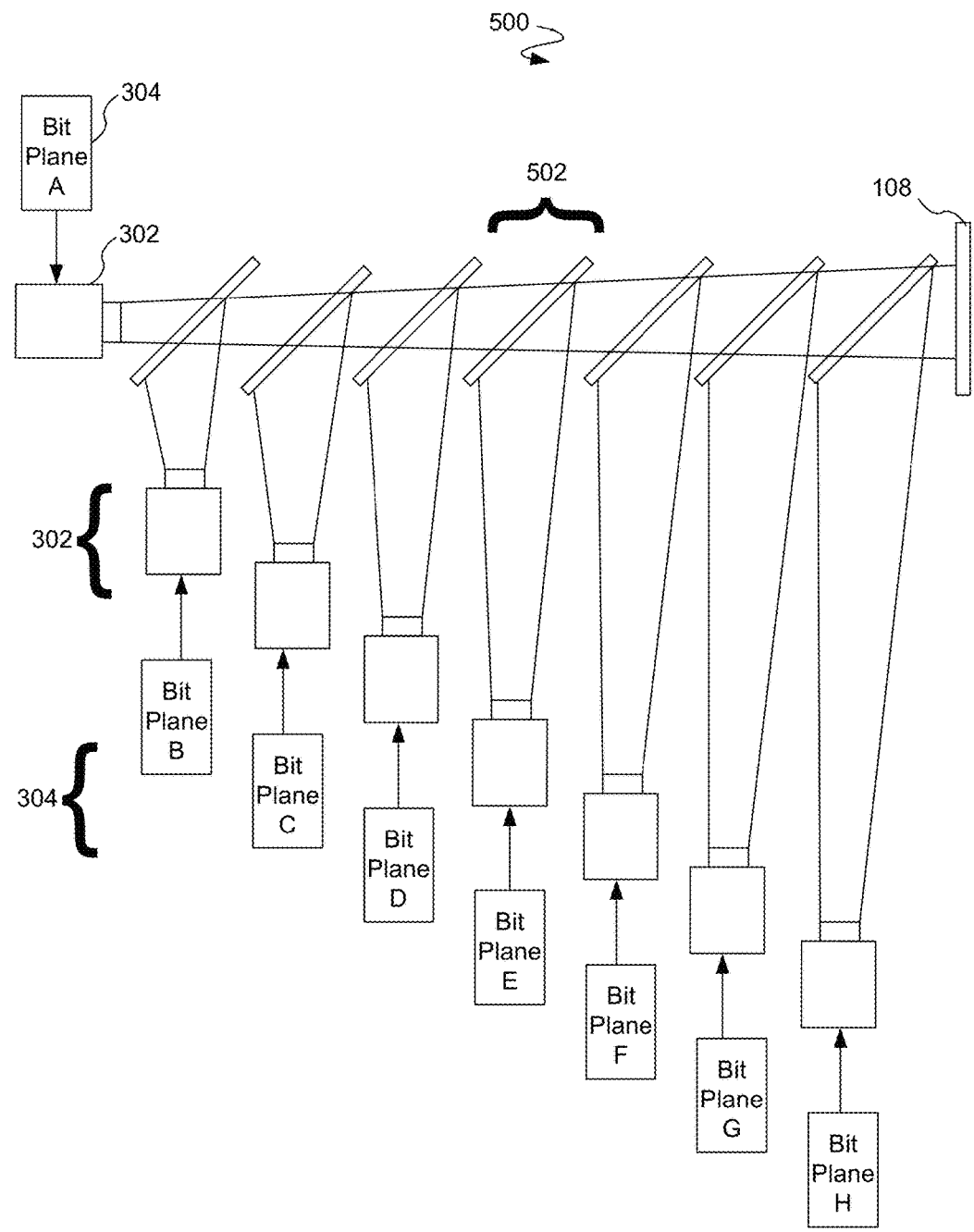
FIG. 5 illustrates a beam combiner tree configuration.

FIG. 5 illustrates a beam combiner tree configuration 500. The beam combiner tree configuration 500 utilizes a plurality of beam combiners 502 to combine the light projections of various high speed projectors 302. The projectors 302 are arranged so that a beam combiner tree of beam combiners 502 is formed to linearly direct the light from the projectors 302 in a combined beam toward the diffuser. In one embodiment, the plurality of beam combiners 502 is a plurality of half silvered mirrors. The plurality of beam combiners 502 may also vary the intensities of the various projections for the corresponding projected bit planes.

Figure 6:
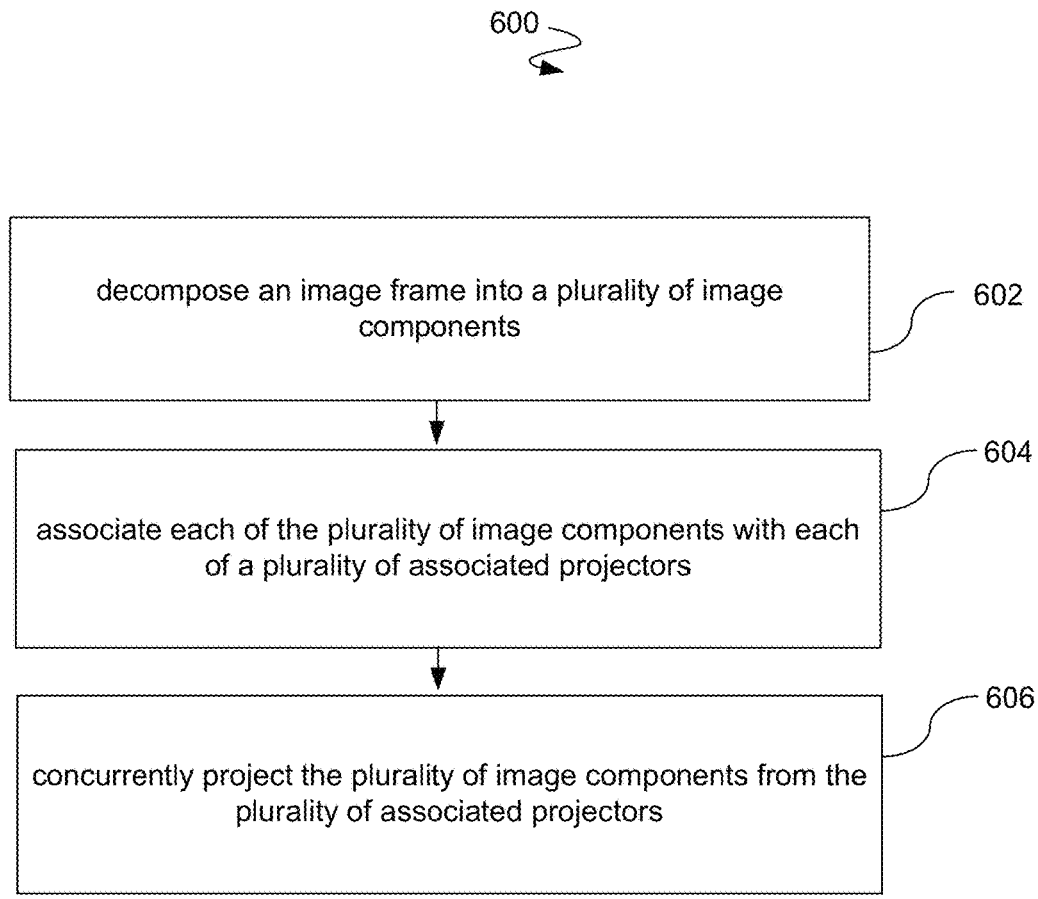
FIG. 6 illustrates a process that is utilized to provide high speed projection with multiple projectors.

FIG. 6 illustrates a process 600 that is utilized to provide high speed projection with multiple projectors. At 602, the process 600 decomposes an image frame into a plurality of image components. Examples of image components are color, brightness, or the like. For example, an image frame may be decomposed into eight subframes such that each of the eight subframes corresponds to a particular brightness intensity of the image frame. The combination of all of the eight subframes results in the image frame with all of the brightness components. Further, at 604, the process 600 associates each of the plurality of image components with each of a plurality of associated projectors. In addition, at 606, the process 600 concurrently projects the plurality of image components from the plurality of associated projectors. The process 600 allows for updates in real time with minimal lag to directly process and feed image frames to the projectors 302 at full frame rate. Further, the process 600 allows for full resolution, e.g., one thousand twenty four by seven hundred sixty eight pixels or one thousand nine hundred twenty by one thousand eight pixels for high definition, and a high speed of approximately twenty four thousand six hundred ninety frames per second or thirty two thousand frames per second respectively.

Figure 7:
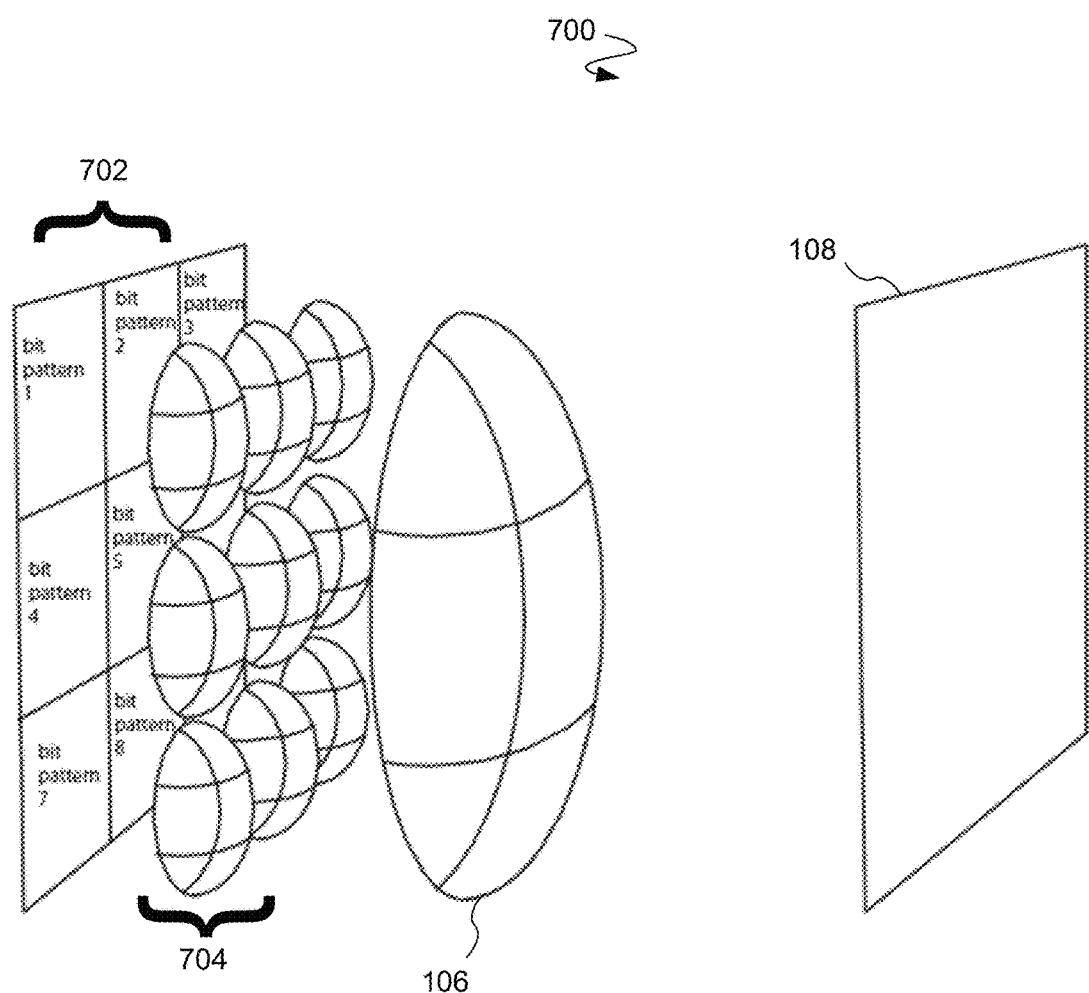
FIG. 7 illustrates an alternative configuration that utilizes a plurality of binary SLMs with a plurality of projection lenses.

FIG. 7 illustrates an alternative configuration 700 that utilizes a plurality of binary SLMs 702 with a plurality of projection lenses 704. Each of the projection lenses 704 corresponds to a particular binary SLM 702 or a section thereof. The binary SLMs 702 concurrently provide illumination through the corresponding projection lenses 704. The optical component 106, e.g., a transform lens, then overlaps the images at a common position at the diffuser 108. Alternatively, OLED panels or sections thereof that are concurrently lit in binary voltage mode may be utilized instead of the plurality of binary SLMs 702.

The configurations provided for herein may also be utilized with scanners or other optics to deflect or modify the high frame rate images. In such instances, the diffuser 108 may be rear projected. In addition, a field lens may be utilized to limit the field of view or lights spread from the diffused image or undiffused image so that light may be gathered at a variety of optics such as projections lenses, scanning mirrors, varifocal optics, or the like.

The processes described herein may be implemented in a general, multi-purpose or special purpose processor. Such a processor will execute instructions, either at the assembly, compiled or machine-level, to perform the processes. Those instructions can be written by one of ordinary skill in the art following the description herein and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A method comprising:
   decomposing an animation sequence into a plurality of subframes such that each subframe in the plurality of subframes corresponds to a distinct image;
   displaying the subframes on spatial light modulators arranged to have distinct viewpoints from each other;

illuminating, with a spatially addressable backlight, each of the subframes displayed on a spatial light modulator segment through a corresponding lenslet in a lenslet array toward at least one optical component; and angularly multiplexing, through the at least one optical component, the corresponding distinct images by overlapping the plurality of subframes that are illuminated so that the plurality of subframes share a common position at a diffuser.

2. The method of claim 1, wherein the corresponding distinct images form an animated sequence after the angular multiplexing.

3. The method of claim 1, wherein the spatially addressable backlight is a binary projector.

4. The method of claim 1, wherein the spatial light modulator is a liquid crystal display panel.

5. An apparatus comprising:
a diffuser;
at least one optical component positioned in proximity to the diffuser;
a lenslet array positioned in proximity to the at least one optical component that angularly multiplexes, through the at least one optical component, a plurality of subframes that each corresponds to a distinct image in an animation sequence so that the plurality of subframes share a common position at the diffuser;
a spatial light modulator positioned in proximity to the lenslet array; and
a spatially addressable backlight that illuminates each of the plurality of subframes displayed on a spatial light modulator segment of the spatial light modulator through the lenslet array toward the at least one optical component.

6. The apparatus of claim 5, wherein the corresponding distinct images form an animated sequence after the angular multiplexing.

7. The apparatus of claim 5, wherein the spatially addressable backlight is a binary projector.

8. The apparatus of claim 5, wherein the spatial light modulator is a liquid crystal display panel.

9. A method comprising:
decomposing an image frame into a plurality of subframes such that each subframe corresponds to a bit plane;
associating each of the bit planes with each of a plurality of projectors; and
concurrently projecting each of the bit planes from the plurality of corresponding projectors.

10. The method of claim 9, wherein the plurality of projectors is arranged so that the corresponding bit planes in the plurality of subframes are projected to overlap at a diffuser.

11. The method of claim 9, wherein the plurality of projectors is arranged so that the corresponding bit planes in the plurality of subframes are projected toward an optical component that redirects projections of the corresponding bit planes in the plurality of subframes to overlap at a diffuser.

12. The method of claim 9, wherein the plurality of projectors is arranged so that the corresponding bit planes in the plurality of subframes are projected toward a plurality of beam combiners that redirect projections of the corresponding bit planes in the plurality of image components to overlap at a diffuser.

13. An apparatus comprising:
a diffuser; and
a plurality of projectors that concurrently project each of a plurality of subframes of a decomposed image frame for display at the diffuser, each of the plurality of subframes being associated with each of the plurality of projectors, each of the plurality of subframes corresponding to a distinct bit plane in the decomposed image frame.

14. The apparatus of claim 13, wherein the plurality of projectors is arranged so that corresponding bit planes in the plurality of subframes are projected to overlap at the diffuser.

15. The apparatus of claim 13, further comprising an optical component that redirects projections of the corresponding bit planes in the plurality of subframes to overlap at the diffuser.

16. The apparatus of claim 13, further comprising a plurality of beam combiners that redirect projections of the corresponding bit planes in the plurality of subframes to overlap at the diffuser.

17. The apparatus of claim 13, wherein each of the plurality of subframes has a differing number of intensity levels.

18. An apparatus comprising:
a diffuser; and
a plurality of projectors each having a spatial light modulator and a lens assembly, the plurality of projectors each illuminating a corresponding subframe of a decomposed animation sequence displayed on a spatial light modulator segment of the corresponding spatial light modulator onto a common position of the diffuser, wherein each of the plurality of subframes corresponds to a distinct image in the decomposed animation sequence.

19. The apparatus of claim 18, wherein each of the plurality of projectors performs synchronized sequential illumination.

20. The apparatus of claim 18, wherein the plurality of projectors is arranged to sequentially illuminate at the common position of the diffuser.

21. The apparatus of claim 18, further comprising at least one optical component positioned in proximity to the diffuser, the plurality of projectors being arranged to sequentially illuminate through at least one optical component that overlaps the plurality of subframes at the common position of the diffuser.

22. The apparatus of claim 18, wherein each of the plurality of projectors has an illuminator.

23. The apparatus of claim 18, wherein each of the plurality of projectors has a spatially addressable backlight.

24. An apparatus comprising:
a diffuser; and
a plurality of projectors each having a spatial light modulator, a lens assembly, and a shutter, the plurality of projectors each shuttering a subframe of a decomposed image frame displayed on a spatial light modulator segment of the corresponding spatial light modulator onto a common position of the diffuser, wherein each of the plurality of subframes corresponding to a distinct bit plane in the decomposed image frame.

25. The apparatus of claim 24, wherein each of the plurality of projectors performs synchronized shuttering.

26. The apparatus of claim 24, wherein the plurality of projectors is arranged to perform shuttering at the common position of the diffuser.

27. The apparatus of claim 24, further comprising at least one optical component positioned in proximity to the diffuser, the plurality of projectors being arranged to perform shuttering through at least one optical component that overlaps the plurality of subframes at the common position of the diffuser.

* * * * *